United States Patent
Yiu et al.

(10) Patent No.: US 9,584,969 B2
(45) Date of Patent: Feb. 28, 2017

(54) SYSTEMS AND METHODS FOR LOCALIZATION

(71) Applicant: Alcatel-Lucent USA Inc., Murray Hill, NJ (US)

(72) Inventors: Simon Yiu, Jersey City, NJ (US); Kai Yang, New York, NY (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 0 days.

(21) Appl. No.: 14/581,425

(22) Filed: Dec. 23, 2014

(65) Prior Publication Data

US 2016/0183050 A1   Jun. 23, 2016

(51) Int. Cl.
| | |
|---|---|
| *H04W 4/02* | (2009.01) |
| *H04W 64/00* | (2009.01) |
| *H04W 24/10* | (2009.01) |
| *H04W 4/04* | (2009.01) |

(52) U.S. Cl.
CPC ............... *H04W 4/021* (2013.01); *H04W 4/04* (2013.01); *H04W 24/10* (2013.01); *H04W 64/003* (2013.01)

(58) Field of Classification Search
CPC .............................. H04W 64/00; H04W 4/02
USPC ........................................... 455/456.1–456.4
See application file for complete search history.

(56) References Cited

U.S. PATENT DOCUMENTS

| | | | |
|---|---|---|---|
| 2006/0087425 A1* | 4/2006 | Haeberlen | G01S 5/0252 340/539.13 |
| 2011/0250904 A1 | 10/2011 | Valletta et al. | |
| 2013/0023284 A1* | 1/2013 | Stanger | G06Q 30/0259 455/456.1 |
| 2014/0282314 A1* | 9/2014 | Mohanty | G06F 17/5045 716/106 |

OTHER PUBLICATIONS

Xin-She Yang, "Nature-Inspired Metaheuristic Algorithms", publ. in 2008, Luniver Press, Frome, United Kingdom, cover, title pages, publ. page, i-v, 1-116, back cover.
Ferris, B. et al., "Gaussian Processes for Signal Strength-Based Location Estimation", Robotics: Science and Systems II Conference, Aug. 16-19, 2006, University of Pennsylvania, Philadelphia, PA, 8 pages.

(Continued)

*Primary Examiner* — Michael T Vu
(74) *Attorney, Agent, or Firm* — Niraj A. Desai

(57) ABSTRACT

Systems and methods for a localization system are provided. In one aspect, a RF signature map for a geographical area is determined using a Gaussian Process ("GP") model. Training RF measurements are taken at some locations within the area to train the GP using the Firefly Algorithm ("FA"). The RF measurements for other locations of the area are predicted using the conditional probabilities of the trained GP and without taking RF measurements at those other locations. The RF signature map is used for fingerprinting localization. In one aspect, a reference RF signature map is constructed for one, some, or all access points ("APs") covering the area. A location of a user device, such as, for example, a smart phone, is then estimated by comparing the (Continued)

RF signals received by the user device from one or more APs with the determined one or more reference RF signature maps using a combined likelihood function.

14 Claims, 4 Drawing Sheets

(56) References Cited

OTHER PUBLICATIONS

Junyang Zhou et al., "Providing Location Services within a Radio Cellular Network using Ellipse Propagation Model", Proceedings of the 19th International Conference on Advanced Information Networking and Applications (AINA'05), Mar. 28-30, 2005. 6 pages.
Gunther, A. et al., "Measuring Round Trip Times to Determine the Distance Between WLAN Nodes", 4th International IFIP-TC6 Networking Conference, Waterloo, Canada, May 2-6, 2005. pp. 768-779.
Bahl, P. et al., "RADAR: An In-building RF-based User location and Tracking System", IEEE INFOCOM 2000, Mar. 2000, vol. 2, pp. 775-784.
H. Laitinen et al., "Database Correlation Method for GSM Location", IEEE VTC 2001, vol. 4, pp. 2504-2508.
M. Nezafat et al., "Localization of Wireless Terminals Using Subspace Matching With Ray-Tracking-Based Simulations", IEEE (SAM) Sensor Array and Multichannel Signal Processing Workshop Proceedings, Jul. 2004, pp. 623-627
E. Kupershtein et al., "Single-Site Emitter Localization via Multipath Fingerprinting", IEEE Transactions on signal processing, vol. 61, No. 1, Jan. 1, 2013, pp. 10-21.
N. S. Kodippili et al., "Integration of Fingerprinting and Trilateration Techniques for Improved Indoor Localization", Seventh International Conference on Wireless and Optical Communications Networks (WOCN), 2010, Sep. 6-8, 2010, Colombo, Sri Lanka, pp. 1-6.
P. Mirowski et al., "SignalSLAM: Simultaneous Localization and Mapping with Mixed WiFi, Bluetooth, LTE and Magnetic Signals", International Conference on Indoor Positioning and Indoor Navigation (IPIN), Oct. 2013, Montbeliard, France, 10 pages.
M. W. M. Gammi Dissanayake et al., "A Solution to the Simultaneous Localization and Map Building (SLAM) Problem", IEEE Transactions on Robotics and Automation, vol. 17, No. 3, Jun. 2001, pp. 229-241.
F. Duvallet et al., "WiFi Position Estimation in Industrial Environments Using Gaussian Processes", In Proc. of 2008 IEEE/RSJ International Conference on Intelligent Robots and Systems, nice, France, Sep. 22-26, 2008, pp. 2216-2221.
C.E. Rasmussen et al., "Gaussian processes for machine learning", The MIT Press, Cambridge, MA, 2005, 266 pages.
X.S. Yang et al., "Firefly algorithm: recent advances and applications", Int. J. Swarm Intelligence, vol. 1, No. 1, 2013, pp. 36-50.
E. Elnahrawy et al., "The Limits of Localization Using Signal Strength: A Comparative Study", In Proceedings of Sensor and Ad Hoc Communications and Networks, Oct. 4-7, 2004, pp. 406-414.
Z. Yang et al., "From RSSI to CSI: Indoor Localization via Channel Response", ACM Computing Surveys, vol. 46, No. 2, Article 25, Publ. date: Nov. 2013 pp. 25-25:32.
X.S. Yang, "Firefly Algorithms for Multimodal Optimization", 5th Symposium on Stochastic Algorithms, Foundations, and Applications, Sapporo, Japan, Oct. 2009, pp. 169-178.
FCC Enhanced 911 regulations, http://www.fcc.gov/encyclopedia/enhanced-9-1-1-wireless-services.

* cited by examiner

Algorithm 1 Firefly Algorithm
―――――――――――――――――――――――――――――――――――――
1: *Define Objective function $J(\theta)$, $\theta = (\theta_1, \ldots, \theta_K)^T$;*
2: *Generate initial position of fireflies $J(\theta_l)$, $l = 1, \ldots, L$;*
3: *Set light intensity $I_l = J(\theta_l)$;*
4: *Initialize $\beta_0$, $\gamma$, and $\xi$;*
5: while t < MaxGeneration do
6:     for $i = 1 : L$ (all $L$ fireflies) do
7:         for $j = 1 : L$ (all $L$ fireflies) do
8:             if $(I_j < I_i)$ then
9:                 move firefly $i$ towards $j$;
10:             end if
11:             Vary attractiveness with distance $r$ via $\exp(-\gamma r^2)$;
12:             Evaluate new solutions and update light intensity;
13:         end for
14:     end for
15:     Rank fireflies and find the current best;
16: end while
―――――――――――――――――――――――――――――――――――――

*FIG. 3*

SYSTEMS AND METHODS FOR LOCALIZATION

TECHNICAL FIELD

The present disclosure is directed towards localization systems, and in particular, to indoor or outdoor localization systems.

BACKGROUND

Localization and/or navigation systems have been gained interest in recent years due to the explosion in the number of networked smart devices and technologies. For example, a localization system can provide important information to a first responder regarding the location of a user in a shopping mall, museum, or a stadium. Location information can also help service providers in identifying coverage holes and traffic hotspots when deploying networks such as 4G Long Term Evolution ("LTE") small cell networks.

A recent trend in the area of localization, and particularly indoor localization, is to use a standard, low-cost, and already deployed network infrastructure. Instead of spending resources in deploying dedicated network infrastructure for localization purposes, the focus is to design solutions that can be integrated with existing network infrastructure. Some examples of network infrastructures suitable for indoor (or outdoor, for that matter) localization of a user device include the WiFi, Bluetooth, and small cell network infrastructures. Trilateration and fingerprinting are examples of popular algorithms that are employed to estimate an indoor location of a user device (where, for example GPS based systems may be obstructed). Fingerprinting and trilateration may also be combined to improve indoor localization accuracy. The trilateration approach estimates the position of a user device by computing distances from multiple reference points. The distances from a reference point can be computed based on Time of Arrival ("TOA") or received signal strength information. In order to enable 2-D positioning, at least three non-collocated and non-collinear reference points are acquired and are applied to linear equations to estimate the location of a user device.

Fingerprinting-based localization typically includes an offline and an online phase. The offline phase includes building a Radio Frequency ("RF") signature map for a given geographical area, such as an area of a building, museum, or an arena. In the online localization phase, the real time received signal strength of signals received/transmitted by the user device is compared with the RF signature map built in the offline phase to compute an estimated location of the user's device.

The time and effort required to build an RF signature map of a geographical area during the offline phase of the fingerprinting based localization system have prompted research into simultaneous localization and mapping systems. However, although the effort to build the RF signature map is reduced in such systems, the performance is typically less than desired for most practical indoor applications.

BRIEF SUMMARY

Systems and methods for indoor or outdoor localization are provided. In various aspects, an RF signature map for a given geographical area such as a floor of a building is determined using a Gaussian Process ("GP") model. Training RF measurements are taken at a relatively small number of locations within the geographical area to train the GP using the Firefly Algorithm ("FA"). The RF measurements for other (e.g., rest) of the locations of the geographical area are predicted using the conditional probabilities of the trained GP and in particular, without taking or having to take any actual RF measurements at those other locations. The RF signature map that represents RF measurements measured at the training locations and the RF measurements predicted for the other locations where no actual RF measurements were taken is then used as a reference signature map for fingerprinting localization. In various embodiments, a reference RF signature map is constructed for one, all, or selected ones of multiple access points (APs) situated at particular locations within the given geographical area. A location of a user device, such as, for example, a smart phone, is then estimated by comparing the RF signal received by the user device from multiple APs with one or more reference signature maps using a combined likelihood function.

In some embodiments, an apparatus includes a processor configured to determine training RF signal data measured at a number of training locations within a geographical area, where the training RF signal data is measured at the number of training locations for RF signals transmitted by at least one wireless transmitter covering the geographical area; determine, by applying the training RF signal data to a Firefly Algorithm, one or more parameters of a Gaussian Process model; and, generate, using the one or more parameters determined using the Firefly Algorithm and the Gaussian Process model, at least one RF signature map for the geographical area for predicting RF signal data at a number of other locations within the geographical area for RF signals transmitted by the at least one wireless transmitter.

In some embodiments, the processor is further configured to estimate a location of a device within the geographical area using RF signal data received by the device from the at least one wireless transmitter and the at least one RF signature map generated by the processor. In some embodiments, the processor is configured to estimate the location of the device as a determined nearest neighbor location within the geographical area. In some embodiments, the processor is configured to determine at least one likelihood function for accounting for at least one variance; and, estimate the location of the device using the determined at least one likelihood function.

In some embodiments, processor is further configured to estimate, using the one or more parameters determined using the Firefly Algorithm and the Gaussian Process model, a mean or variance RF signal value for predicting the RF signal data at the number of other locations within the geographical area.

In some embodiments, the processor is configured to generate the RF signature map for the geographical area without measuring RF signal data at the other locations of the geographical area.

In some embodiments, the least one RF signature map generated by the processor includes at least one estimated mean and variance RF signal value for at least one of the number of other locations within the geographical area. In some embodiments, the processor is configured to determine RF signal strength data for the determined training RF signal data.

BRIEF DESCRIPTION OF THE DRAWINGS

FIG. 3 illustrates a pseudo-code example of training a GP using the Firefly Algorithm in accordance with various aspects of the disclosure.

DETAILED DESCRIPTION

Figure 1:
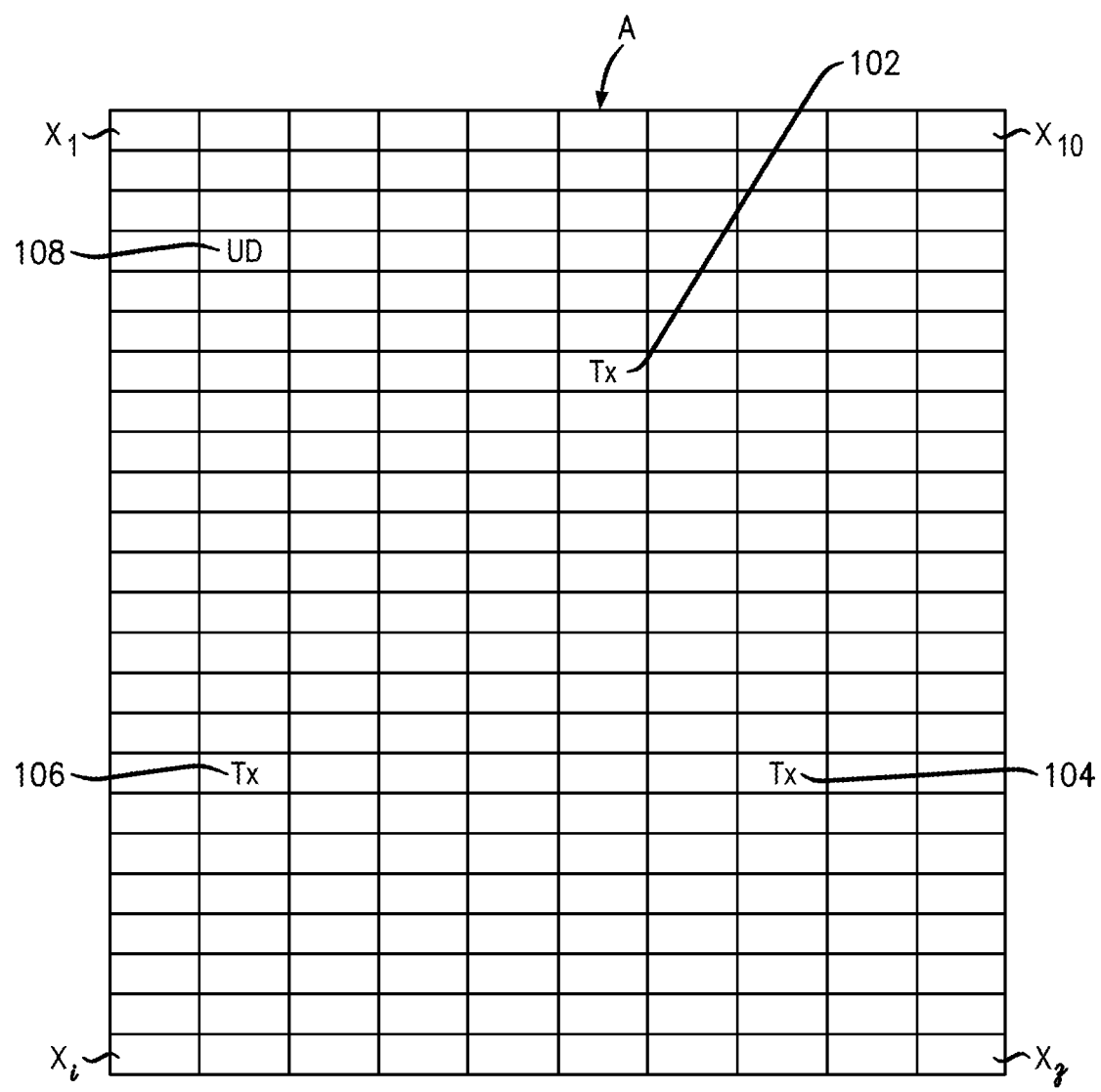
FIG. 1 illustrates an example representation of a geographical area, such as a floor of a building.

Various aspects of the disclosure are described below with reference to the accompanying drawings, in which like numbers refer to like elements throughout the description of the figures. The description and drawings merely illustrate the principles of the disclosure. It will be appreciated that those skilled in the art will be able to devise various arrangements that, although not explicitly described or shown herein, embody the principles and are included within spirit and scope of the disclosure.

As used herein, the term, "or" refers to a non-exclusive or, unless otherwise indicated (e.g., "or else" or "or in the alternative"). Furthermore, as used herein, words used to describe a relationship between elements should be broadly construed to include a direct relationship or the presence of intervening elements unless otherwise indicated. For example, when an element is referred to as being "connected" or "coupled" to another element, the element may be directly connected or coupled to the other element or intervening elements may be present. In contrast, when an element is referred to as being "directly connected" or "directly coupled" to another element, there are no intervening elements present. Similarly, words such as "between", "adjacent", and the like should be interpreted in a like fashion.

The present disclosure uses matrix notation. Matrices and vectors are identified in the description. Additionally, $[\bullet]^T$, $E[\bullet]$, and $\mathbb{R}$ denote matrix or vector transposition, statistical expectation, and the set of real numbers, respectively. In addition, $[X]_{i,j}$, $[x]_i$, $\|\bullet\|$, and $\|\bullet\|_2$ denote the element in row i and column j of matrix X, the i-th element of column vector x, the L-1 norm, and the L-2 norm, respectively. Further, $\beta_{ij}$ is represents the delta function. In particular, $\beta_{ij}=1$ if i=j and, $\beta_{ij}=0$ if i≠j. Lastly, $|\bullet|$ represents either the absolute value of a scalar or the cardinality of a set, depending on the context.

Systems and methods for localization of a user device in a geographical area are provided. In various aspects, an RF signature map for a given geographical area such as a floor of a building is determined using a Gaussian Process ("GP") model. Training RF measurements are taken at a relatively small number of locations within the geographical area to train the GP using the Firefly Algorithm ("FA"). The RF measurements for other (e.g., rest) of the locations of the geographical area are predicted using the conditional probabilities of the trained GP and in particular, without taking or having to take any actual RF measurements at those other locations. The RF signature map that represents RF measurements measured at the training locations and the RF measurements predicted for the other locations where no actual RF measurements were taken is then used as a reference signature map for fingerprinting localization. In various embodiments, a reference RF signature map is constructed for one, all, or selected ones of multiple access points (APs) situated at particular locations within the given geographical area. A location or position of a user device, such as, for example, a smart phone, within the geographical area is then estimated by comparing the RF signal received by the user device from multiple APs with one or more reference signature maps using a combined likelihood function.

FIG. 1 illustrates an example of a 2D geographical area $A \triangleq \mathbb{R}^2$ that is covered by wireless transmitters 102, 104, 106 situated at given locations of the geographical area and includes a user device 108 ("UD") for which localization information may be desired. Although it is assumed that the wireless transmitters 102, 104, 106 are WIFI APs, this is not a limitation. In other embodiments, the wireless transmitters may be Bluetooth beacons, small cell APs, or the like, for example. While three wireless transmitters (N=3) are illustrated in FIG. 1, it will be appreciated that other embodiments may include a greater, lesser, or any suitable number N of wireless transmitters (Tx). The number and location of the wireless transmitters (e.g., transmitters 102, 104, and 106) in the geographical area A may be chosen depending upon the size of the geographical area, the type of the geographical area (e.g., based on obstacle or other considerations) or the desired quality of the coverage. The geographical area A may be an outdoor or indoor area.

The geographical area A is divided into a grid including a number Z of grid locations or cells $x_1 \ldots x_Z$ as illustrated in FIG. 1. The size, shape, and number Z of the grid locations $x_1 \ldots x_Z$ may vary based on the overall size of the geographical area and the desired level of resolution of the localization system. Each grid location or cell $x_i$, $1 \leq i \leq Z$ within geographical area A may be associated with Cartesian coordinates:

$$x_i \triangleq (x_i^1, x_i^2) \in A$$

The RF signal from a wireless transmitter n, $1 \leq n \leq N$ (e.g., wireless transmitter (Tx) 102, 104, or 106) at a grid location $x_i$ in the geographical area A is denoted herein as $f_n(x_i)$ and its value depends on the surrounding environment and the propagation characteristics of the geographical area. It is assumed, but is not necessary, that the received RF signal $f_n(x_i)$ at each grid location $x_i$ is stationary and smooth. As a result, an RF signal at a given grid location $x_i$ may be generally expressed as:

$$y_m(x_i) = f_n(x_i) + v \quad \text{Eq. (1)}$$

where $f_n(x_i)$ represents, as noted above, the estimated noise-free RF signal at the given grid location $x_i$ that is received from the selected wireless transmitter and v is noise that is modeled as an independent and identically distributed ("i.i.d.") zero-mean Gaussian random signal with a variance $\sigma_v^2$.

More particularly, in various aspects of the present disclosure $f_n(x_i)$ of Eq. (1) which represents the estimated noise-free RF signal that is received from the selected wireless transmitter at a given grid location $x_i$ is modeled as a GP. In particular, the GP is trained using a relatively few number of measured RF signal values at different grid locations of the geographical area A using the Firefly Algorithm, described below. Furthermore, once the GP is trained, the mean and variance of the RF signal values at the other locations are predicted with no RF measurements at the other locations based on the conditional probabilities of the GP. An RF signature map is constructed that includes the mean and variance values respectively associated with the measured and the expected RF signal values for various or all grid locations of the area A. The RF signature map can then be used for determining a position or location of a user device, or in other words, for localization of the user device within the geographical area.

A GP defines a statistical distribution over function $f$, where $f$ is a random function for mapping a dimensional input space $f: X \to \mathbb{R}$. In general, if $f \triangleq (f(s_1), \ldots, f(s_m))$ is an m-dimensional vector of function values evaluated at m points $\{s_1, \ldots, s_m\} \in X$, then the distribution $p(f)$ is a GP if for any finite subset $\{s_1, \ldots, s_m\} \in X$ the marginal distribution $p(f)$ over that finite subset has a multivariate Gaussian distribution. In this case, $f$ is completely characterized by its mean function and covariance function. Furthermore, a collection of random variables $\{f(s_i): s_i \in X\}$ is understood to be drawn from a GP with a mean function $m(\cdot)$ and covariance function $k(\cdot,\cdot)$ if for any finite set of elements $\{s_1, \ldots, s_m\} \in X$, the associated finite set of random variables $f(s_1), \ldots, f(s_m)$ has a distribution:

$$\begin{bmatrix} f(s_1) \\ \vdots \\ f(s_m) \end{bmatrix} \sim N\left( \begin{bmatrix} m(s_1) \\ \vdots \\ m(s_m) \end{bmatrix}, \begin{bmatrix} k(s_1, s_1) & \ldots & k(s_1, s_m) \\ \vdots & \ddots & \vdots \\ k(s_m, s_1) & \ldots & k(s_m, s_m) \end{bmatrix} \right).$$

Thus, it is customary to use the following general notation to represent a GP:

$$f(\cdot) \sim GP(m(\cdot), k(\cdot,\cdot)) \qquad \text{Eq. (2)}$$

$$m(s) = E[f(s)] \qquad \text{Eq. (3)}$$

$$k(s,s') = E[(f(s) - m(s))(f(s') - m(s'))]. \qquad \text{Eq. (4)}$$

As noted previously, $f_n(x_i)$ represents the estimated noise-free RF signal at the given grid location $x_i$ that is received from a selected wireless transmitter n. Thus, in order to predict the expected RF signal $f_n(x^*)$ for any possible coordinate location $x^*$ in area A using GP, the present disclosure models $f_n(x_i)$ as $f(x_i): A \to R$ as a GP using equations (2)-(4) as:

$$f_n(x_i) \sim GP(m_n(\cdot), k_n(\cdot,\cdot)).$$

Assuming a simple free space propagation model, $f_n(x_i)$ is expressed in dB scale as:

$$f_n(x_i) = C - 10\alpha \log 10(\|x_i - x_s^n\|) + \Psi(x_i, x_s^n), \qquad \text{Eq. (5)}$$

where, it is assumed that C is a constant, $\alpha$ is the path-loss exponent, and is $\Psi(x_i, x_s^n)$ the location-dependent shadow fading between the source location of the wireless transmitter at $x_s^n$ and a receiver device at a location $x_i$.

It is assumed that $\Psi(x_i, x_s^n)$ follows a log-normal distribution, i.e., $\Psi(x_i, x_s^n) \sim N(0, \sigma_\Psi^2)$, where $\sigma_\Psi^2$ is the shadowing variance. The resulting spatial auto-correlation function of $\Psi(x_i, x_s^n)$ can then be expressed as:

$$k(x_i, x_j) \triangleq E[\Psi(x_i, x_s^n), \Psi(x_j, x_s^n)] = \sigma_\Psi^2 \exp\left( \frac{\|x_i - x_j\|}{d_c} \right) \qquad \text{Eq. (6)}$$

where $d_c$ is the correlation distance between $x_j$ and $x_j$. With the above assumptions and using the definitions in Eq. (2)-(4), the mean of the GP $f_n(x_i)$ is seen to be:

$$m_n(x_i) = C - 10\alpha \log 10(\|x_i - x_s^n\|), \qquad \text{Eq. (7)}$$

and, the covariance function is as defined in Eq. (6) above.

Thus, one feature of the present disclosure is that $f_n(x_i)$ of Eq. (1), where $f_n(x_i)$ represents the noise-free RF signal received at a given location $x_i$ of the geographical area A from a particular wireless transmitter n (e.g., wireless transmitter 102, 104, or 106)), is modeled as a GP having a mean defined as defined herein by Eq. (7) and a covariance function as defined herein in Eq. (6). Furthermore, as described further below, the parameters of the GP, or in other words, the parameters of Eq. (6) and Eq. (7), also referenced herein as hyper-parameters of the GP, are trained using a relatively few number of measured RF signal values at different grid locations of the geographical area A using the Firefly Algorithm. Once the hyper-parameters of the GP (defined herein as a set $\theta \triangleq [C, \alpha, \sigma_\nu, d_c, \sigma_\Psi]$) are trained using the FA algorithm, an RF signature map is constructed using Eq. (6) and Eq. (7) that includes the predicted mean and variance values of the RF signals respectively associated with those locations of the area A where no RF measurements were taken. As also noted previously, the RF signature map is used for determining a position or location of a user device, or in other words, for localization of the user device within the geographical area. These and other aspects of the present disclosure are now described below with reference to the example process 200 of FIG. 2.

Figure 2:
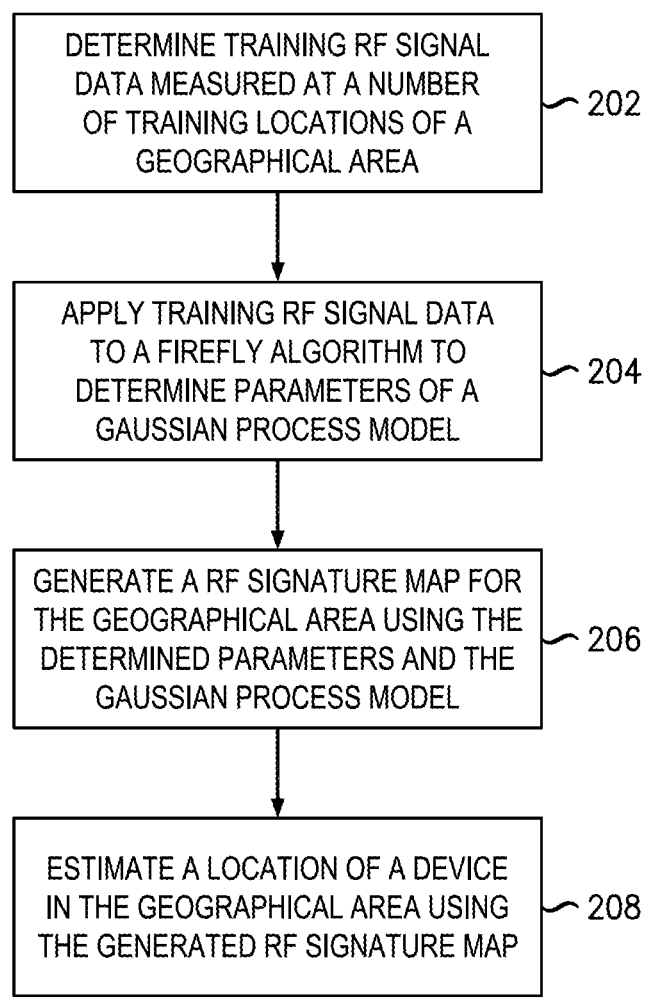
FIG. 2 illustrates is a process flow diagram for a localization system in accordance with various aspects of the disclosure.

FIG. 2 is a flow chart illustrating an example process 200 for estimating the location (e.g., coordinates) of a user device 108 within the geographical area A of FIG. 1 in accordance with various aspects of the disclosure. Although particular steps are described in a particular order in the process 200 of FIG. 2 for enabling the reader to more easily understand the various aspects and principles of the disclosure, in other embodiments certain steps may be performed in a different order. Furthermore, in some embodiments, certain steps may also be added, modified, combined, or omitted as will be appreciated by one of ordinary skill in the art.

As an overview of process 200, steps 202-206 may be considered to be part of an offline or preprocessing stage that are performed to generate a respective reference RF signature map for selected one or more of the wireless transmitters 102, 104, and 106 for use in the localization system. Steps 202-206 then need not be performed again unless the location or configuration of the wireless transmitter for which these steps were performed changes or, alternatively, additional (or new) wireless transmitters are selected for inclusion in the localization system for which reference RF signature maps are desired. Step 208 may be considered to be part of an online or real-time stage that is performed as often as desired to determine (or track) a location of one or more user device(s) 108 within the geographical area A using the one or more of the RF signature maps generated in the offline stage.

Step 202 includes determining training sample data that includes RF signal measurements that are taken at a subset number of locations (or coordinates) within the geographical area A for a wireless transmitter (e.g., 102). The RF signal measurements (also referred to as "training measurements") may be RF signal strength measurements (e.g., Received Signal Strength Indication or "RSSI") that are taken at the subset number of locations (also referenced herein as "training locations" or "training coordinates") using any suitable wireless receiver device such as, for example, a smart phone or other device capable of receiving and processing wireless signals. In some embodiments, an average (e.g., a time-average) determined from multiple RF measurements at a training location may be taken as the training RF measurement for that location, which may be advantageous in reducing the effects of small-scale fading. The locations and the number of the training RF measurements may be chosen based on the size, topology, or other considerations (e.g., for intersecting or non-intersecting portions of the area) of the geographical area A, or may be chosen arbitrarily. In one embodiment, by way of example only, the number of chosen training locations may be about 5-20% of the overall grid locations that are uniformly (or semi-uniformly) distributed within the geographical area.

Let $S_n=\{(x_1, y_n(x_1)), (x_2, y_n(x_2)), (x_3, y_n(x_3)) \ldots, (x_S, y_n(x_S))\}$ denote the set of training sample data that are taken at given locations within the geographical area A for a given wireless transmitter where $S \triangleq |S|$ represents the number of training data. Furthermore, let $X_n \triangleq [x_1; x_2; x_3; \ldots; x_S]$ be a $S \times 2$ matrix including the Cartesian coordinates of the training locations and $Y_n \triangleq [y_n(x_1); y_n(x_2); y_n(x_3); \ldots; y_n(x_S)]$ be a S dimensional column vector that includes corresponding training RF measurements that are taken at training locations or coordinates $x_1; x_2; x_3; \ldots; x_S$. It is noted here that each of the measured RF signals $y_n(x_i)$ in $S_n$ is the sum of two Gaussian random variables (see Eq. 1 above) since the noise v is assumed to be Gaussian. Therefore, the vector $y_n$, which is the set of measured RF values that include noise, follows a joint multivariate Gaussian distribution which is expressed herein as:

$$y|X;\theta \sim N(m,C) \quad \text{Eq. (8)}$$

where, $\theta \triangleq [C, \alpha, \sigma_v, d_c, \sigma_\Psi])$, $m \triangleq [m(x_1); m(x_2); \ldots; m(x_S)])$, and C is an $S \times S$ matrix with elements $|C|_{ij} = k(x_i, x_j) + \sigma_v^2 \delta_{ij}$. Note, that for convenience, the subscript n is dropped in Eq. (8) since it is the same for each of the other wireless transmitters or for all n ($\forall n$).

Step 204 includes training the GP of Eq. (6) and Eq. (7) by determining GP parameters based on the measured training data $S_n$ determined in step 202. More particularly, the set of GP parameters defined as $\theta \triangleq [C, \alpha, \sigma_v, d_c, \sigma_\Psi])$ above are determined using the Firefly Algorithm. The training is carried out by maximizing the log likelihood function in Eq. (8) with the training dataset S. Since log is a monotonic function, the optimization of the GP parameters is equivalent to:

$$\theta_{opt} = \arg\min_\theta -\log(p(y|X;\theta)). \quad \text{Eq. (9)}$$

The desired optimization above is a nonlinear optimization problem and the cost function $J(\theta) \triangleq -\log(p(y|X; \theta))$ generally has multiple local maxima. Thus, in various aspects the desired optimization or training of the CP parameters is obtained in step 204 by using the Firefly Algorithm, which is now described herein.

The FA is a swarm intelligence ("SI") based approach for solving multimodal, global optimization problems and was developed based on the flashing pattern of tropical fireflies. FA is characterized by three rules. First, all fireflies are unisex, so that one firefly is attracted to other fireflies regardless of sex. Second, attractiveness is proportional to their brightness, thus for any two flashing fireflies, the less bright one will move to the more bright one. The attractiveness is proportional to the brightness and they both decrease as their distance increases. If no one is brighter than a particular firefly, it will move randomly. Third, brightness of a firefly is related to the value of the objective function. For maximization problems, the brightness is proportional to the value of the objective function.

In the FA, there is a swarm of L agents/fireflies and $\theta_l$ represents the solution for firefly l with corresponding cost $J(\theta_l), l=1, \ldots, L$. The attractiveness of a firefly is determined by its brightness or light intensity which in turn is associated with the cost function. In the preset disclosure, it is assumed that the light intensity of firefly is equal to the cost function, i.e., $I_l = J(\theta_l)$. In addition, the attractiveness decreases monotonically and exponentially with distance. In particular, the attractiveness between two fireflies with a separation distance r away from each other is defined herein as:

$$\beta(r) = \beta_0 e^{-\gamma r^2}, \quad \text{Eq. (10)}$$

where $\beta_0$ denotes the maximum attractiveness at r=0 and $\gamma$ represents the light absorption coefficient that describes the variation of the attractiveness and its value is responsible for the speed of the FA convergence.

The distance between two fireflies i and j can be computed by:

$$r_{ij} = \|\theta_i - \theta_j\|_2 = \sqrt{\sum_{k=1}^{K}(\theta_{ik} - \theta_{jk})^2} \quad \text{Eq. (11)}$$

where $\theta_{ik}$ denotes the k-th component of $\theta_i$, and K is the dimension of the search space $\theta_i$.

Finally, the movement of the firefly is governed by:

$$\theta_i^{t+1} = \theta_i^t + \beta_0 e^{-\gamma r_{ij}^2}(\theta_j^t - \theta_i^t) + \xi(\text{rand}-\tfrac{1}{2}) \quad \text{Eq. (12)}$$

where rand is a random number generator with output rand $\epsilon(0,1)$. The first term ($\theta_i^T$) in the right hand side of Eq. 12 is the current position of firefly i at a discrete time t, the second term ($\beta_0 e^{-\gamma r_{ij}^2}(\theta_j^t - \theta_i^t)$) is the firefly's attractiveness, while the third term ($\xi(\text{rand}-\tfrac{1}{2})$) is used for random movement if there is not any brighter firefly. In general, in accordance with one aspect of the present disclosure, $\beta_0=1$, $\xi \epsilon(0,1)$, and $\gamma \Sigma(0.1, 10)$.

Figure 4:
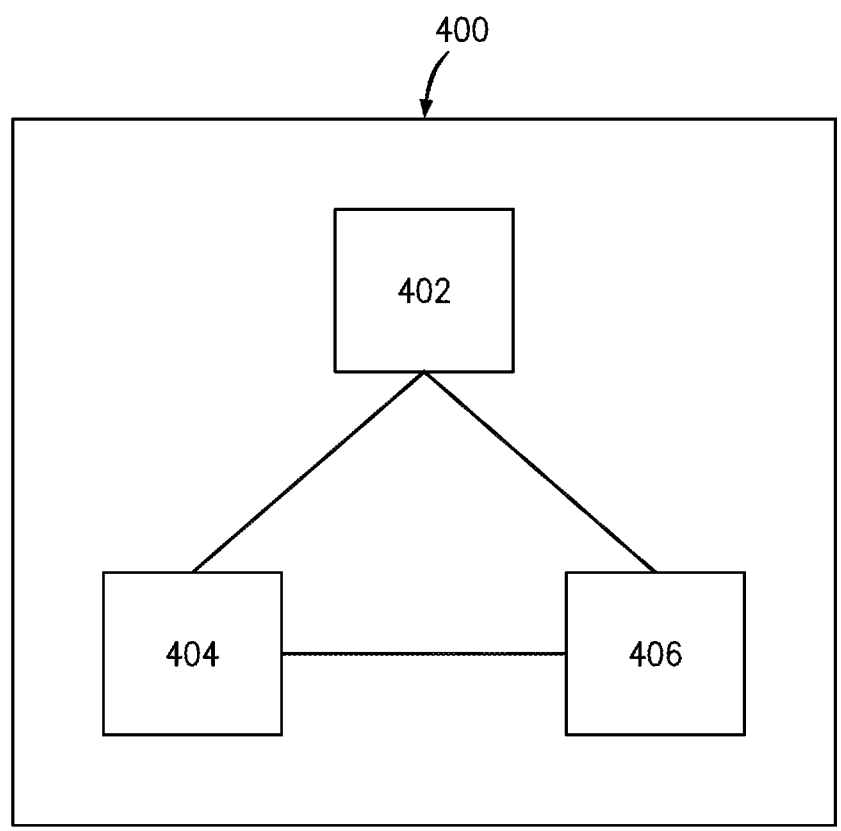
FIG. 4 illustrates a block-diagram example of an apparatus for implementing various aspects of the disclosure.

FIG. 3 illustrates example pseudo-code for implementing the FA in a computing device such as the apparatus 400 illustrated in FIG. 4, where the K elements of $\theta$ are the parameters $\theta \triangleq [C, \alpha, \sigma_v, d_c, \sigma_\Psi])$, that need to be trained. To initiate the FA, random initial positions of the fireflies are generated. The light intensity is set to the cost function. In the while loop, fireflies move to other brighter fireflies by updating $\theta$. At the end of the Firefly algorithm, the fireflies converge to a location (represented by $\theta$) which provides the best solution (or in other words, the optimum values) for the desired optimization of the parameters in $\theta$.

Step 206 includes determining the reference RF signature map for the geographical area A for the selected wireless transmitter n based on the determined GP parameters from step 204, where the RF signature map includes predicted mean and covariance values for estimating RF signal values at various locations of the area A without taking any RF measurements at those locations.

In one aspect, GP model is used to build a RF signature map using the, for example, optimized GP parameters resulting from the application of the FA in step 204. It is recalled, based on Eq. 1, that $f \triangleq f_n(x^*)$ is the noise-free received signal strength estimation at location $x^*$ of geographical area A. As before, the variable n is omitted for brevity. The joint distribution of the $(S+1) \times 1$ column vector $|y; f|$ is a multivariate Gaussian random variable with the following distribution:

$$\begin{bmatrix} y \\ f \end{bmatrix} \sim \left( \begin{bmatrix} m \\ m(x^*) \end{bmatrix}, \begin{bmatrix} C & b \\ b^T & k \end{bmatrix} \right) \quad \text{Eq. (13)}$$

where $k \triangleq k(x^*, x^*)$ and $[b]_i \triangleq k(x^*, x_i)$, $1 \leq i \leq S$.

Using the rules of conditioning probability of Gaussian random variables in Eq. (13), it follows that:

$$p(f|x^*, X, y, \theta) \sim N(\mu_{x^*}, \sigma_{x^*}^2) \quad \text{Eq. (14)}$$

$$\mu_{x^*} = m(x^*) + b^T C^{-1}(y - m) \quad \text{Eq. (15)}$$

$$\sigma_{x^*}^2 = k - b^T C^{-1} b \quad \text{Eq. (16)}$$

Thus, in one aspect GP model is used to build a RF signature map with predicted mean as described in Eq. (15) and predicted variance as described Eq. (16) for any or all remaining locations or cells of the geographical area A without taking any prior RF measurements at those locations of the geographical area. The resulting map is used for localization purpose.

Step 208 includes determining an estimated position of a user device in the geographical area using one or more of the reference RF signature maps generated for the one or more wireless transmitters. The estimated RF signals $\hat{f} \triangleq f_n(x^*)$ that are estimated based on the reference RF signature map generated in step 206 is used for fingerprinting localization of the user device 108 illustrated in FIG. 1. One relatively simple approach is to determine the nearest neighbor based on the Euclidean distance. In this aspect, the real-time RF signal measured at the user device 108 from one or more wireless transmitters n for which RF signature maps are constructed using steps 202-206 is compared to the mean of the estimated RF signal as predicted from the RF signature maps. Suppose that $y_n^r(x')$ is the real-time measured signal at the user device for a wireless transmitter (e.g., 102, 104 or 106) as the unknown (and to be determined) location x', a decision rule to determine the nearest neighbor cell or location $\hat{x}$ based on $y_n^r(x')$ and the RF signature map generated for the wireless transmitter may be:

$$\hat{x} = \underset{x^*}{\operatorname{argmin}} \sum_{n=1}^{N} |\mu_{x^*}^n - y_n^r(x')|^2 \qquad \text{Eq. (17)}$$

The $\mu_{x^*}^n$ indicates the mean of the estimated RF signal from the wireless transmitter n at the location x*.

It is noted here that the decision rule (Eq. (17)) does not take into account the uncertainty of the estimated RF signal. Recall that GP provides the mean as well as the variance of the estimation (see Eq. (14)-(16)). Intuitively, an estimate having a lower variance may be given a higher weight than the another estimate that has a higher variance. Therefore, in another aspect, a likelihood function to take the variance into account may be defined for a given wireless transmitter as:

$$p_n(y_n^r(x') \mid \mu_{x^*}^n) \propto \frac{1}{\sqrt{2\pi(\sigma_{x^*}^{2,n} + \sigma_v^2)}} \exp\left(\frac{-(y_n^r(x') - \mu_{x^*}^n)}{2(\sigma_{x^*}^{2,n} + \sigma_v^2)}\right) \qquad \text{Eq. (18)}$$

where $\sigma_{x^*}^{2,n}$ is the variance of the predicted signal strength from wireless transmitter n at location x* and is $\sigma_v^2$ the variance of the measurement noise. Essentially, Eq. (18) defines the likelihood of observing RF signal $y_n^r(x')$ from the wireless transmitter n based on the predicted signal (e.g., predicted signal strength) $\mu_{x^*}^n$ at location x*. In various aspects, such likelihood function may be determined for one, some, or all wireless transmitters and combined to arrive with the following alternative decision rule that takes variance into account as:

$$\hat{x} = \underset{x^*}{\operatorname{argmax}} \prod_{n=1}^{N} p_n(y_n^r(x') \mid \mu_{x^*}^n)^{\chi} \qquad \text{Eq. (19)}$$

where $\chi \in (0:1)$ is introduced to prevent overconfident estimates due to some possible highly peaked likelihoods.

FIG. 4 depicts a high-level block diagram of a computing apparatus 400 suitable for implementing various aspects of the disclosure (e.g., one or more steps of process 200 of FIG. 2 and/or the exemplary pseudo code of the Firefly Algorithm of FIG. 3). Although illustrated in a single block, in other embodiments the apparatus 400 may also be implemented using parallel and distributed architectures. Thus, for example, various steps and aspects disclosed herein may be implemented and performed using apparatus 400 sequentially, in parallel, or in a different order based on particular implementations. Apparatus 400 includes a processor 402 (e.g., a central processing unit ("CPU")), that is communicatively interconnected with various input/output devices 404 and a memory 406. Apparatus 400 may be communicatively connected with other devices (e.g., the wireless transmitters 102, 104, 106, or the user device 108), via any conventional type of wired or wireless network.

The processor 402 may be any type of processor such as a general purpose central processing unit ("CPU") or a dedicated microprocessor such as an embedded microcontroller or a digital signal processor ("DSP"). The input/output devices 404 may be any peripheral device operating under the control of the processor 402 and configured to input data into or output data from the apparatus 400, such as, for example, network adapters, data ports, and various user interface devices such as a keyboard, a keypad, a mouse, or a display.

Memory 406 may be any type of memory suitable for storing electronic information, such as, for example, transitory random access memory (RAM) or non-transitory memory such as read only memory (ROM), hard disk drive memory, compact disk drive memory, optical memory, etc. The memory 406 may include data (e.g., training data samples obtained from one or more training locations in a geographical area) and instructions (e.g., for implementing one or more steps of the process 200 and/or various aspects of the disclosure) which, upon execution by the processor 402, may configure or cause the apparatus 400 to perform or execute the functionality or aspects described hereinabove. In addition, apparatus 400 may also include other components typically found in computing systems, such as an operating system, queue managers, device drivers, or one or more network protocols that are stored in memory 406 and executed by the processor 402.

Although a particular embodiment of apparatus 400 is illustrated in FIG. 4, in other embodiments one or more aspects of the present disclosure may also be implemented using one or more application specific integrated circuits (ASICs), field programmable gate arrays (FPGAs), or any other combination of hardware or software. For example, data may be stored in various types of data structures (e.g., linked list) which may be accessed and manipulated by a programmable processor (e.g., CPU or FPGA) that is implemented using software, hardware, or combination thereof.

Although aspects herein have been described with reference to particular embodiments, it is to be understood that these embodiments are merely illustrative of the principles and applications of the present disclosure. It is therefore to be understood that numerous modifications can be made to the illustrative embodiments and that other arrangements can be devised without departing from the spirit and scope of the disclosure.

The invention claimed is:

1. An apparatus for a localization system, the apparatus comprising:
    a processor configured to:
        determine training RF signal data measured at a number of training locations within a geographical area, the training RF signal data being measured at the number of training locations for RF signals transmitted by at least one wireless transmitter covering the geographical area;

determine, by applying the training RF signal data to a Firefly Algorithm, one or more parameters of a Gaussian Process model;

estimate, using the one or more parameters determined using the Firefly Algorithm and the Gaussian Process model, mean or variance RF signal values for predicting RF signal data at a number of other locations within the geographical area; and, generate, using the training RF signal data and the mean or variance RF values determined using the Firefly Algorithm and the Gaussian Process model, at least one RF signature map for the geographical area for RF signals transmitted by the at least one wireless transmitter.

2. The apparatus of claim 1, wherein the processor is further configured to:

estimate a location of a device within the geographical area using RF signal data received by the device from the at least one wireless transmitter and the at least one RF signature map generated by the processor.

3. The apparatus of claim 2, wherein the processor is further configured to:

estimate the location of the device as a determined nearest neighbor location within the geographical area.

4. The apparatus of claim 2, wherein the processor is further configured to:

determine at least one likelihood function for accounting for at least one variance; and, estimate the location of the device using the determined at least one likelihood function.

5. The apparatus of claim 1, wherein the processor is configured to generate the RF signature map for the geographical area without measuring RF signal data at the other locations of the geographical area.

6. The apparatus of claim 1, wherein the at least one RF signature map generated by the processor includes at least one estimated mean and variance RF signal value for at least one of the number of other locations within the geographical area.

7. The apparatus of claim 1, wherein the processor is configured to determine RF signal strength data for the determined training RF signal data.

8. A computer-implemented method for localization of a user device in a geographical area, the method comprising:

determining training RF signal data measured at a number of training locations within the geographical area, the training RF signal data being measured at the number of training locations for RF signals transmitted by at least one wireless transmitter covering the geographical area;

applying the training RF signal data to a Firefly Algorithm and computing, using a processor, one or more parameters of a Gaussian Process model;

estimating, using the one or more parameters determined using the Firefly Algorithm and the Gaussian Process model, mean or variance RF signal values for predicting RF signal data at a number of other locations within the geographical area; and, generating, using the training RF signal data and the mean or variance RF signal values determined using the Firefly Algorithm and the Gaussian Process model, at least one RF signature map for the geographical area for RF signals transmitted by the at least one wireless transmitter.

9. The computer-implemented method of claim 8, further comprising:

estimating a location of the user device within the geographical area using RF signal data received by the device from the at least one wireless transmitter and the at least one RF signature map generated by the processor.

10. The computer-implemented method of claim 9, wherein estimating the location of the user device further comprises determining a nearest neighbor location within the geographical area.

11. The computer-implemented method of claim 9, further comprising:

determining at least one likelihood function for accounting for at least one variance; and, estimating the location of the device using the determined at least one likelihood function.

12. The computer-implemented method of claim 8, generating the RF signature map for the geographical area without measuring RF signal data at the other locations of the geographical area.

13. The computer-implemented method of claim 8, wherein generating the at least one RF signature map further comprises computing at least one estimated mean and variance RF signal value for at least one of the number of other locations within the geographical area.

14. The computer-implemented method of claim 8, wherein determining the training RF signal data includes determining RF signal strength data from the RF signal data.

* * * * *